Figure 1:
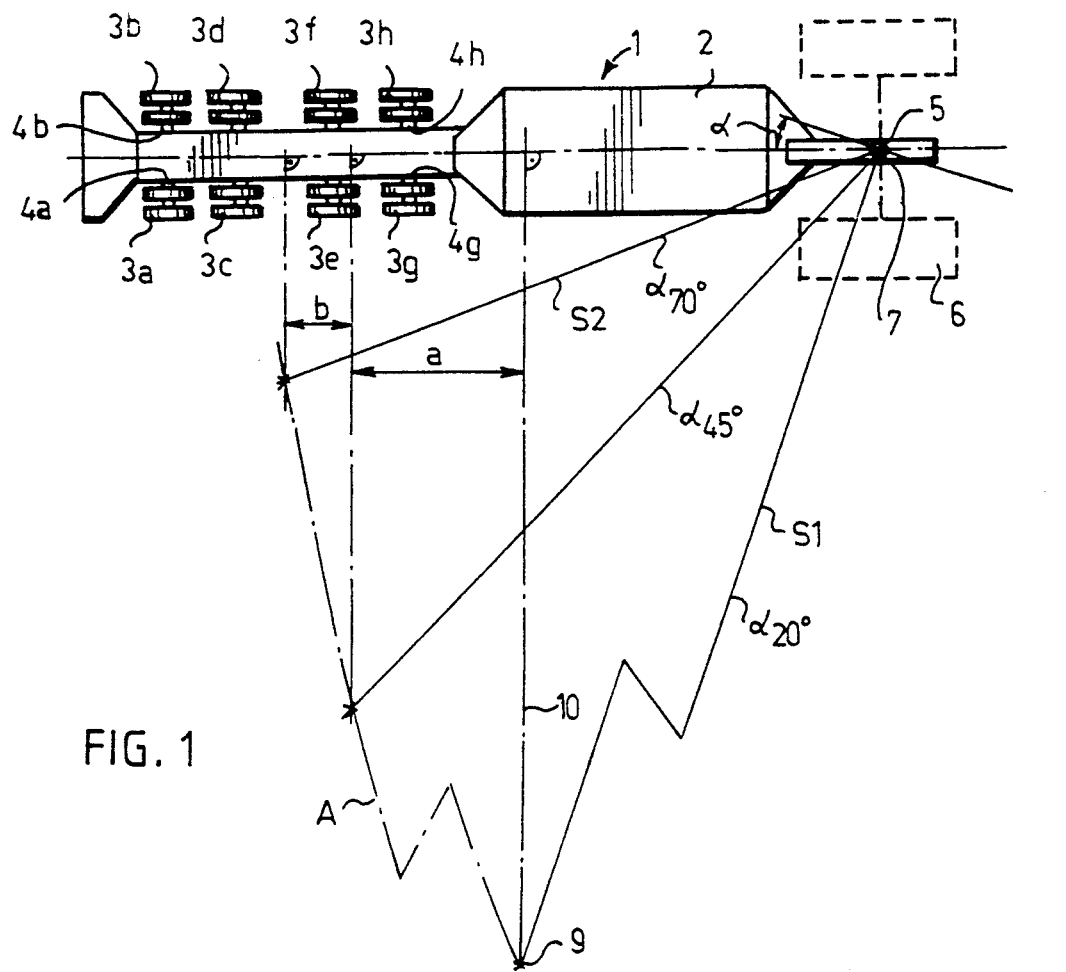

United States Patent [19]

Vänninmaja

[11] Patent Number: 5,145,198
[45] Date of Patent: Sep. 8, 1992

[54] METHOD OF CONTROLLING A TRANSPORT MEANS AND A TRANSPORT MEANS

[75] Inventor: Pekka Vänninmaja, Tervakoski, Finland

[73] Assignee: Teco-Systems Oy, Tervakoski, Finland

[21] Appl. No.: 587,675

[22] Filed: Sep. 25, 1990

[51] Int. Cl.$^5$ .............................................. B62D 53/06
[52] U.S. Cl. .................................... 280/426; 280/442; 280/103
[58] Field of Search ............... 280/426, 442, 100, 103; 180/79.4, 132, 140, 144

[56] References Cited

U.S. PATENT DOCUMENTS

| | | | |
|---|---|---|---|
| 3,734,538 | 5/1973 | Humes | 280/426 |
| 4,982,976 | 1/1991 | Kramer | 280/426 |
| 5,013,057 | 5/1991 | Vänninmaja et al. | 280/442 X |

FOREIGN PATENT DOCUMENTS

| | | | |
|---|---|---|---|
| 289472 | 12/1987 | Japan | 280/442 |
| 8901436 | 2/1989 | PCT Int'l Appl. | 280/426 |

Primary Examiner—Charles A. Marmor
Assistant Examiner—Kevin Hurley
Attorney, Agent, or Firm—Ladas & Parry

[57] ABSTRACT

A method of controlling a transport means (1) comprising a body (2) and wheels (3a to 3h) attached to the body (2) on both sides of its central line one after another in the longitudinal direction of the body, all the wheels (3a to 3h) being arranged to turn about vertical axes (4a to 4h) of turning to change the direction of travel of the transport means (1) so that rotation axes (11a to 11h) for all the wheels (3a to 3h) intersect substantially at the same vertical axis of turning (9) so that the position of the axis of turning in the longitudinal direction of the transport means (1) is shifted in proportion to the magnitude of the an angle of turning ($\alpha$); and a transport means (1). To avoid an unexpected obstacle (10) the turning of the wheels (3a to 3h) is deviated from their normal path by shifting the axis of turning (9) in the longitudinal direction of the transport means (1) towards its forward end, so that the rear end moves with a larger curved movement than usually. When the driving conditions are normalized, the axis (9) of turning is returned to its normal position.

6 Claims, 1 Drawing Sheet

METHOD OF CONTROLLING A TRANSPORT MEANS AND A TRANSPORT MEANS

This invention relates to a method of controlling a transport means comprising a body and wheels attached to the body on both sides of its central line one after another in the longitudinal direction of the body, all the wheels being turned about vertical axes of turning at an angle to the longitudinal direction of the body to change the direction of travel of the transport means in such a way that rotation axes for all the wheels intersect substantially at the same vertical axis of turning, whereby the transport means turns about the axis of turning when it moves, and when the angle of turning of the transport means at least exceeds a predetermined value, the wheels are turned with respect to each other in such a way that the position of the axis of turning in the longitudinal direction of the transport means shifts in proportion to the magnitude of the angle of turning.

The invention is also concerned with a transport means comprising a body; wheels attached to the body on both sides of its central line one after another in the longitudinal direction of the body, the wheels being arranged to turn about vertical axes of turning to change the direction of travel of the transport means; power means for turning the wheels; and control means comprising an adjusting device for controlling the power means in such a way that when the direction of travel is changed, rotation axes for the wheels intersect substantially at the same vertical axis of turning; and a control sensor detecting the angle of turning of the transport means, the sensor being arranged to control the adjusting device so that it controls the power means in such a way that at least when the angle of turning exceeds a predetermined value, the position of the axis of turning in the longitudinal direction of the transport means is shifted in proportion to the angle of turning.

Heavy objects, such as containers and work machines are usually transported by means of trailers or vehicles provided with several wheels and shafts comprising several wheels. Wheels in such trailers are usually mounted in one end while the other end comprises coupling means by which the trailer is turnably coupled to a tractor. When transferring a load, the tractor draws or pushes the trailer, depending on the conditions, and the driver controls the movement of the trailer by turning the tractor in a suitable direction with respect to the trailer. There are prior art solutions in which the wheel assembly or a portion of it can in some way be turned with respect to the trailer in proportion to the angle of turning of the tractor, in order to improve the turnability and ease of movement of the vehicle.

German Offenlegungsschrift 22 00 739 discloses a solution in which some of the wheels are turned in proportion to the angle of turning of the tractor in such a way that the axes of turning of all the wheels supporting the trailer intersect at the same centre of turning. In this publication the location of the centre of turning is constant in the longitudinal direction of the trailer. Correspondingly, the ratio of the angle of turning of the wheels to the angle of turning of the tractor is also constant. This causes problems with the handling of the trailer when the driving conditions or the path deviates for some reason from the originally designed, as a result of which it may be necessary to move the trailer back and forth to get it into the desired position.

U.S. Pat. No. 3,733,084, in turn, discloses a solution in which the wheels of the trailer are able to turn relative to the trailer and the driver can position the wheels in parallel with each other at an angle to the trailer so that the trailer need not always be moved along a curved path. In the publication the position of the wheels is in no way dependent on the angle of turning of the tractor, being in most cases in no proportion to it. As the wheels are always positioned in parallel with each other when deviated as described above, no more than one wheel pair is able to turn about a turning point coinciding with the axis of turning of the tractor, whereas the other wheel pairs have to move in the transverse direction, being dragged along the surface of the road, which wears down the tires and strains the trailer.

The object of the present invention is to provide a method of controlling a transport means in such a way that the axes of turning of all wheels, irrespective of the direction of travel and angle of turning of the equipment, always intersect at the same axis of turning, whereby all the wheels move along a curved path, which reduces the wear of the tires as well as the strains exerted on the equipment. This is achieved according to the invention by turning the wheels in such a way that the axis of turning moves along a predetermined curve relative to the body of the transport means.

The basic idea of the invention is to control the wheels in such a way that they follow the turning movement of the tractor so that the axes of all the wheels always intersect at the same turning point and that when the driving conditions change, the control is, if necessary, modified in such a way that the turning point is shifted during normal drive towards the rear of the equipment so that the angle of turning is increased or, to avoid an unexpected obstacle, still further backwards or alternatively forwards, depending on the location of the obstacle to be avoided. The turning of the trailer end remote from the tractor is thereby controlled so that the obstacle can be avoided and the trailer can be positioned in the desired driving direction easily by a simple control movement.

A further object of the invention is to provide a transport means in which all wheels can always be positioned so that their axes intersect at the same turning point, the location of which can be altered according to driving conditions to cause the trailer end remote from the tractor to move along a desired path. This is achieved according to the invention by means of a transport means in which the control means comprise an adjusting device which controls the turning of the wheels in such a way that the axis of turning moves along a predetermined curve with respect to the body of the transport means when the angle of turning changes.

The basic idea of the transport means of the invention is that the angles of turning of the wheels of the trailer and, as a consequence, the path of the trailer, can be adjusted by means of the adjusting device comprised in the control means, e.g., to avoid an unexpected obstacle, so that the path deviates from the normal curved path while the axes of the wheels nevertheless always intersect at the same turning point as the axis of turning of the trailer when the trailer is turned relative to the ground. An advantage of the equipment of the invention is that it is easy to control in different situations and its wheels always move by rolling along the ground instead of being dragged, which involves a considerable reduction in wear as compared with prior art solutions.

Figure 2:
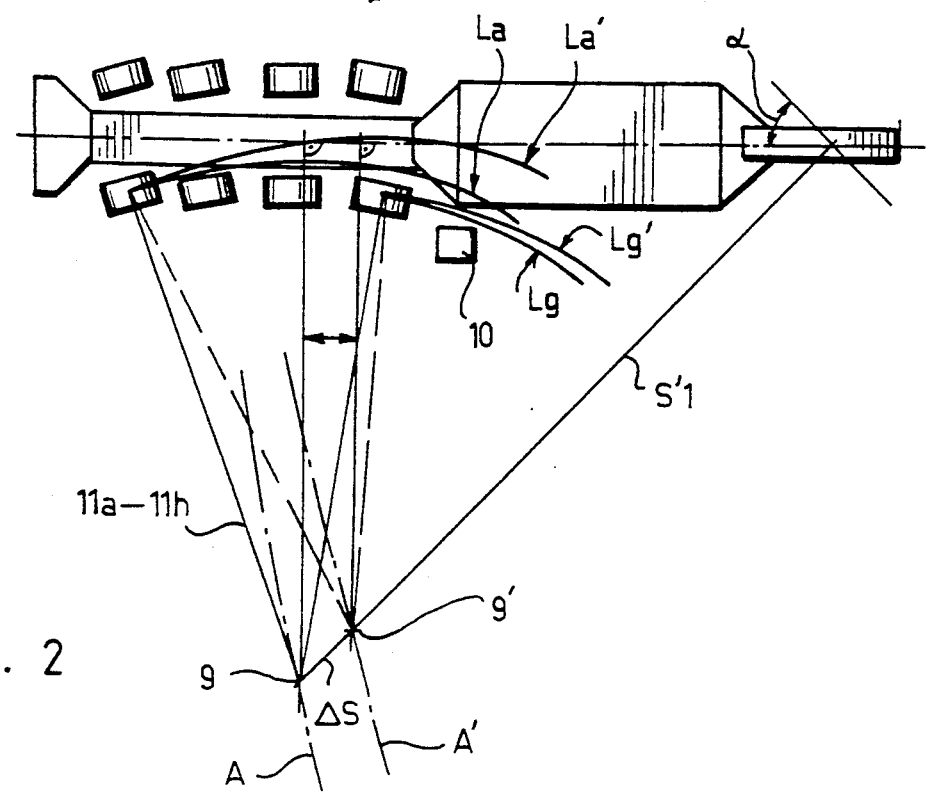

The invention will be described in greater detail in the attached drawings, in which FIG. 1 is a schematic view of a vehicle according to the invention and its control during a normal curved movement; and FIG. 2 illustrates the trailer of the invention when the direction of travel of the rear end of the trailer has been changed on account of an obstacle.

FIG. 1 shows a trailer 1 comprising a body 2 and wheel pairs 3a to 3h at the rear end of the body. The wheel pairs are turnable about vertical axes 4a to 4h. The other end of the body 2 is provided with a joint 5 by means of which a tractor 6 is coupled to the trailer 1 and about which the tractor 6 can be turned. The joint 5 is provided with a sensor 7 which detects the angle of turning $\alpha$ of the tractor 6 relative to the longitudinal axis of the body 2. The sensor 7 is connected to control means (not shown) which control the wheel pairs 3a to 3h on the basis of the angle of turning $\alpha$ detected by the sensor in such a way that rotation axes 11a to 11h for all the wheel pairs intersect at the same point. In normal drive, the position of the axis of turning 9 shifts in accordance with the turning angle $\alpha$ along a curve A so that the larger the angle $\alpha$ the farther back in the longitudinal direction of the body 2 the axis of turning 9 is positioned. The radius of turning of the joint 5 thereby shifts from a line S1 to a line S2. To control the transport means, it is also possible to select a curve A' which extends in a different way. The axis of turning 9' thereby shifts along the curve A' in accordance with the angle $\alpha$ and the turning radius of the joint 5 shifts, e.g., from a line S'1 to a line S'2. Several such curves can be drawn, whereby one of them normally acts as a control curve. It is, of course, obvious that the same curves can be used on equal terms when turning in the opposite direction.

If the path of the transport means has not been chosen properly for some reason, or an unexpected obstacle is observed in the path of the transport means, the turning of the transport means 1 is controlled in another way. In FIG. 2, the rear end of the trailer 1 would hit an obstacle 10 unless the position of the point of turning 9 is shifted closer to the tractor 6 as compared with normal drive, so that it moves according to the curve A'. As compared with normal drive, the curved movement of the rear end of the trailer 1 is thereby larger so that the rear end is at a greater distance from the obstacle 10. This is illustrated in FIG. 2 with curves La, Lg and L'a and L'g indicating the curved movement of the wheels 3a and 3g, respectively. With normal movement along the curve A, the wheels 3a to 3h move along the curves La and Lg. When the axis of turning 9 is changed into the axis of turning 9' extending in accordance with the control curve A', the turning radius of the joint 5 changing by the length $\Delta S$, the wheels 3a and 3g turn so that they start to follow the curves L'a and L'g. Correspondingly, the other wheels are displaced so that they move along curves the axes of turning of which coincide with the axis 9' on the curve A'.

After the transport means has been displaced relative to the obstacle 10 so that it is able to pass by it, the control of the wheels 3a to 3h is released and the normal control is restored, so that the wheels turn into a position originally proportional to the angle of turning $\alpha$ of the tractor and the axis of turning coincides with the axis 9 in accordance with the position proportional to said angle of turning on the curve A and in the longitudinal direction of the trailer at a corresponding point.

The method of the invention can be applied in transport means in various ways. Normally, the axis of turning can be shifted along one predetermined curve relative to the body of the transport means. If need be, however, the wheels can be arranged to turn by means of the additional control member either in proportion to the additional control or always to a predetermined extent when the additional control is applied, so that the axis of turning is shifted from its position according to the normal control over a distance forwards in the longitudinal direction of the trailer. Further, the control can be realized by providing several different control curves for the control of the axis of turning, one of which is selected for normal control so that the axis of turning normally moves relative to the trailer along said curve but can, if need be, be arranged to follow one of the other control curves. Correspondingly, the control can be realized so that the axis of turning normally follows a predetermined curve the shape of which can be altered continuously by the additional control when the driving conditions are changed. The control can further be realized in such a way that the normal control will be restored automatically after the deviation control is no longer needed.

I claim:

1. A method of controlling a transport means comprising a body having a longitudinal axis and a plurality of wheels attached to the body on each side thereof one after another in the longitudinal direction of the body, the method comprising the steps of turning all the wheels about vertical axes of turning through an angle with respect to the longitudinal direction of the body during the turning of the transport means so that rotation axes of all of the wheels intersect substantially at a same vertical axis of turning, and, at least when the angle of turning of the transport means is greater than a predetermined angle, turning all of the wheels with respect to one another so that a position of the axis of turning in the longitudinal direction of the transport means shifts in proportion to the magnitude of the angle of turning, wherein the all of the wheels are turned so that the axis of turning follows one selected curve of several curves, relative to the body of the transport means, for controlling the transport means, whereby, if required by the driving conditions, the axis of turning is arranged to temporarily follow another curve, and then again returned to follow said selected curve when the driving conditions are substantially normalized.

2. A method of controlling a transport means comprising a body having a longitudinal axis and a plurality of wheels attached to the body on each side thereof one after another in the longitudinal direction of the body, the method comprising the steps of turning all the wheels about vertical axes of turning through an angle with respect to the longitudinal direction of the body during the turning of the transport means so that rotation axes of all of the wheels intersect substantially at a same vertical axis of turning, and, at least when the angle of turning of the transport means is greater than a predetermined angle, turning all of the wheels with respect to one another so that a position of the axis of turning in the longitudinal direction of the transport means shifts in proportion to the magnitude of the angle of turning, wherein the all of the wheels are turned so that the axis of turning moves along a predetermined curve relative to the body of the transport means, and wherein the predetermined curve is continuously adjustable in shape, the shape being selected according to the driving conditions.

3. A method according to claim 2, wherein the shape of the predetermined curve is modified temporarily when required by the driving conditions, the originally selected shape of the predetermined curve being restored when the driving conditions are substantially normalized.

4. A transport means comprising a body having a longitudinal axis, a plurality of wheels attached to the body on each side thereof one after another in the longitudinal direction of the body, of all the wheels being arranged to turn about vertical axes of turning to change the direction of travel of the transport means; power means for turning all of the wheels; control means including an adjusting device for controlling the power means in such a way that when the direction of travel is changed rotation axes for all of the wheels intersect substantially at the same vertical axis of turning; and a control sensor detecting an angle of turning of the transport means, the sensor being arranged to control the adjusting device so that it controls the power means in such a way that at least when the angle of turning exceeds a predetermined value, the position of the axis of turning is shifted in the longitudinal direction of the transport means in proportion to the angle of turning, wherein the adjusting device of the control means controls the turning of all of the wheels in such a way that the axis of turning is shifted along one selected curve of several alternative curves, with respect to the body of the transport means, according to the driving conditions, and wherein the control means includes a control member arranged to control the axis of turning so that it temporarily follows another curve of said alternative curves, and wherein the adjusting device is arranged to automatically connect the axis of turning to follow the originally selected curve when the control member is released.

5. A transport means comprising a body having a longitudinal axis; a plurality of wheels attached to the body on each side thereof one after another in the longitudinal direction of the body, of all the wheels being arranged to turn about vertical axes of turning to change the direction of travel of the transport means; power means for turning all of the wheels; control means including an adjusting device for controlling the power means in such a way that when the direction of travel is changed rotation axes for all of the wheels intersect substantially at the same vertical axis of turning; and a control sensor detecting an angle of turning of the transport means, the sensor being arranged to control the adjusting device so that it controls the power means in such a way that at least when the angle of turning exceeds a predetermined value, the position of the axis of turning is shifted in the longitudinal direction of the transport means in proportion to the angle of turning, wherein the adjusting device of the control means controls the turning of all of the wheels in such a way that the axis of turning is shifted along a predetermined curve with respect to the body of the transport means when the angle of turning changes, and wherein the adjusting device is arranged to be controlled in such a way that the shape of the predetermined curve is continuously adjustably in a predetermined way.

6. A transport means according to claim 5, wherein the control means also includes a control member enabling the shape of the predetermined curve to be changed temporarily, whereby the adjusting device is arranged to automatically connect the axis of turning to follow the originally selected curve when the control member is released.

* * * * *